US010747418B2

(12) United States Patent
Pieper et al.

(10) Patent No.: US 10,747,418 B2
(45) Date of Patent: Aug. 18, 2020

(54) FRICTIONLESS INTERFACE FOR VIRTUAL COLLABORATION, COMMUNICATION AND CLOUD COMPUTING

(71) Applicant: COSCREEN, INC., Menlo Park, CA (US)

(72) Inventors: Till F. Pieper, Menlo Park, CA (US); Max Andaker, San Francisco, CA (US)

(73) Assignee: COSCREEN, INC., Menlo Park, CA (US)

(*) Notice: Subject to any disclaimer, the term of this patent is extended or adjusted under 35 U.S.C. 154(b) by 731 days.

(21) Appl. No.: 15/208,181

(22) Filed: Jul. 12, 2016

(65) Prior Publication Data
US 2017/0024100 A1 Jan. 26, 2017

Related U.S. Application Data

(60) Provisional application No. 62/196,850, filed on Jul. 24, 2015, provisional application No. 62/196,848, (Continued)

(51) Int. Cl.
*G06F 3/0486* (2013.01)
*H04L 29/06* (2006.01)
(Continued)

(52) U.S. Cl.
CPC ........ *G06F 3/0486* (2013.01); *G06F 3/04842* (2013.01); *G06F 40/40* (2020.01);
(Continued)

(58) Field of Classification Search
CPC .. G06F 3/0486; G06F 3/04845; G06F 3/0485; G06F 3/04883; G06F 3/0482;
(Continued)

(56) References Cited

U.S. PATENT DOCUMENTS 5,758,110 A * 5/1998 Boss ............... G06F 3/0481
715/204
8,789,094 B1 * 7/2014 Singh ............... G06F 3/00
725/37
(Continued)

FOREIGN PATENT DOCUMENTS

CN 107085868 A 8/2017

OTHER PUBLICATIONS

International Search Report and Written Opinion for International Application No. PCT/US2016/041904 dated Oct. 27, 2016.
(Continued)

Primary Examiner — Seth A Silverman
(74) Attorney, Agent, or Firm — Cooley LLP

(57) ABSTRACT

Described herein are systems and methods for a virtual communication and collaboration application platform which automates the setup and operation of a virtual collaboration session, senses and reacts to user activity and contextual cues, and provides real-time intuitive interaction steps to enable users to easily interact in a simple and user-friendly manner. The Virtual Collaboration and Computing Platform provides a shared application window visible to multiple users on different displays for which users can easily share multiple types of data and applications through basic drag-and-drop interactions.

17 Claims, 10 Drawing Sheets

Related U.S. Application Data filed on Jul. 24, 2015, provisional application No. 62/196,846, filed on Jul. 24, 2015, provisional application No. 62/196,847, filed on Jul. 24, 2015.

(51) Int. Cl.
*H04L 29/08* (2006.01)
*G06F 3/0484* (2013.01)
*G06F 40/40* (2020.01)

(52) U.S. Cl.
CPC .......... *H04L 65/4015* (2013.01); *H04L 67/10* (2013.01); *H04L 67/42* (2013.01)

(58) Field of Classification Search
CPC ......... G06F 17/28; H04L 67/42; H04L 67/10; H04L 65/4015
See application file for complete search history.

(56) References Cited

U.S. PATENT DOCUMENTS

| | | | | |
|---|---|---|---|---|
| 2002/0049786 | A1* | 4/2002 | Bibliowicz | G06F 3/0481 715/211 |
| 2007/0157298 | A1* | 7/2007 | Dingwall | G06F 21/34 726/8 |
| 2007/0239828 | A1* | 10/2007 | Patton | G06Q 10/10 709/204 |
| 2010/0318360 | A1* | 12/2010 | Uehara | G06K 9/00335 704/260 |
| 2011/0154192 | A1 | 6/2011 | Yang | |
| 2012/0010995 | A1* | 1/2012 | Skirpa | G06F 3/0481 705/14.49 |
| 2014/0282072 | A1* | 9/2014 | Martinez | G06F 3/0486 715/748 |
| 2015/0085061 | A1* | 3/2015 | Sun | H04N 7/142 348/14.07 |
| 2017/0053649 | A1 | 2/2017 | Choi et al. | |
| 2018/0061375 | A1 | 3/2018 | Marquardt et al. | |

OTHER PUBLICATIONS

Quartz Display Services Reference, Mac Developer Library, Retrieved on Jun. 16, 2016, Published Online by Apple. URL: https://developer.apple.com/library/mac/documentation/GraphicsImaging/Reference/Quartz_Services_Ref/index.html.

Quartz Window Services Reference, Mac Developer Library, Retrieved on Jun. 16, 2016, Published Online by Apple. URL: https://developer.apple.com/library/mac/documentation/Carbon/Reference/CGWindow_Reference/#//apple_ref/doc/uid/TP40008073-CH2-SW2.

H.264 : Advanced video coding for generic audiovisual services, International Telecommunications Union, Jun. 6, 2016. URL: http://www.itu.int/rec/T-REC-H.264.

Schulzrinne, et al. RTP: A Transport Protocol for Real-Time Applications, Request for Comments: 3550, Internet Society, 2003, Retrieved on Jun. 16, 2016 URL: https://tools.ietf.org/html/rfc3550.

Developing with libopus (API reference), Opus-Codec Documentation, 2011-2014, Retrieved on Jun. 16, 2016 URL: http://www.opus-codec.org/docs/.

Electron website, Retrieved on Jun. 16, 2016. URL: http://electron.atom.io/

NW.js, Retrieved on Jun. 16, 2016. URL: http://nwjs.io/

Face Detection using Haar Cascades. Open Source Computer Vision 3.1.0. Retrieved on Jun. 16, 2016 URL: http://docs.opencv.org/master/d7/d8b/tutorial_py_face_detection.html#gsc.tab=0.

Ashutosh Saxena and Andrew Y. N., Learning Sound Location from a Single Microphone, Stanford University, Retrieved on Jun. 16, 2016. URL: http://ai.stanford.edu/~ang/papers/icra09-Monaural-Localization.pdf.

NSSpeechRecognizer, Mac Developer Library, Retrieved on Jun. 16, 2016, Published online by Apple. URL: https://developer.apple.com/library/mac/documentation/Cocoa/Reference/ApplicationKit/Classes/NSSpeechRecognizer_Class/index.html.

OpenCV API Reference. OpenCV 2.4.13.0 documentation, OpenCV dev. team, Jun. 16, 2016. URL: http://docs.opencv.org/modules/refman.html.

Github Repository tesseract-ocr, Tesseract Open Source OCR Engine, Jun. 16, 2016. URL: https://github.com/tesseract-ocr.

Docker using Docker Toolbox, Installation Guide for for Mac OS X, Retrieved on Jun. 16, 2016. URL: https://docs.docker.com/installation/mac/.

WebRTC—RTCDataChannel for Chrome, Developers Google, Retrieved on Jun. 16, 2016. URL: https://developers.google.com/web/updates/2013/02/WebRTC-RTCDataChannel-demo-API-changes-and-Chrome-talks-to-Firefox?hl=en.

Skype Features. Skype and/or Microsoft, Retrieved on Jun. 16, 2016. URL: https://www.skype.com/en/features/.

Screen Hero Features. Screen Hero and/or Slack, Retrieved on Jun. 16, 2016. URL: https://screenhero.com/features.html.

Cisco WebEx Web Conferencing Product Comparison, Cisco, Retrieved on Jun. 16, 2016. URL: http://www.cisco.com/c/en/us/products/conferencing/product_comparison.html.

Apple Developer API Reference init(windowListFromArrayScreen Bounds:windowArray:imageOption:), Mac Developer Library, Retrieved on Jun. 24, 2016, Published Online by Apple. URL: https://developer.apple.com/reference/coregraphics/cgimage/1455730-init.

* cited by examiner

FRICTIONLESS INTERFACE FOR VIRTUAL COLLABORATION, COMMUNICATION AND CLOUD COMPUTING

RELATED APPLICATIONS

This application claims the benefit of U.S. Provisional Application No. 62/196,846 filed Jul. 24, 2015, U.S. Provisional Application No. 62/196,847 filed Jul. 24, 2015, U.S. Provisional Application No. 62/196,848 filed Jul. 24, 2015, and U.S. Provisional Application No. 62/196,850 filed on Jul. 24, 2015.

FIELD OF THE INVENTION

Systems and methods provided herein relate to a virtual collaboration, communication and computing platform, and more specifically to an interactive and adaptive shared application environment providing an intuitive and instantly available setup, operation and interaction interface in conjunction with the underlying cloud infrastructure.

BACKGROUND OF THE INVENTION

Today's software solutions require mostly multiple manual interactions to establish collaboration and communication sessions between users. These users need to actively go through a number of steps to share data, documents and applications with remote users. This lengthy manual process is a hindrance to effective and natural communication and collaboration.

For example, in most collaboration software solutions the communication partners need to be addressed individually when a session is established, e.g. by selecting their user names or by entering their email addresses. If at a later point in time a similar group wants to collaborate again, this process needs to be repeated.

Also, existing software solutions require a dedicated host to setup collaboration sessions who usually controls the participation and sharing credentials of all other members. So they are not able to share and control content in a democratic, equally empowering way, e.g. using multiple mouse pointers without having to go through additional authorization steps. They usually also cannot share and receive content in a device- and operating system-agnostic way which would make the content appear as if it would be natively provided on their local computing environment, recreating the same native interaction experience with remote content as with local content. E.g. these solutions cannot combine local and remote application windows, which could be shared from a set of diverse remote devices with different operating system and form factors, on a local computing device in a way that it makes them appear and react as if they were all hosted locally.

Traditional collaboration applications use popups with previews or selection windows with dropdowns to pick the window or object to be shared, creating an unnecessary hurdle for the user experience of highly interactive and collaborative teams.

Therefore, it is desirable to develop systems and methods which simplify the virtual interaction between remote users, which are available instantly and permanently and provide augmenting and complementing capabilities locally and remotely.

SUMMARY OF THE INVENTION

Embodiments described herein provide systems and methods for a virtual communication and collaboration application platform which automates the setup and operation of a virtual collaboration session, senses and reacts to user activity and contextual cues, and provides real-time intuitive interaction steps to enable users to easily interact in a simple and user-friendly manner. The Virtual Collaboration and Computing Platform provides an environment visible to multiple users on different devices for which users can easily share multiple types of data and applications through basic drag-and-drop interactions.

For example, it describes how collaboration partners could exchange data (e.g. applications, application windows, videos, audio, text, objects) in the most intuitive manners by leveraging native and basic hand and mouse interactions ingrained in computer operating systems and the augmentation with natural user interfaces (e.g. eye tracking, face detection, face, gesture and voice recognition).

In one embodiment, a technical system for interactive, virtual collaboration, the system comprising a plurality of client devices running at least one application displayed on a device display, a remote server in communication with the plurality of client devices, wherein the plurality of client devices are configured to display a distinct graphical component which shares content within the application between the plurality of devices, wherein the remote server is configured to coordinate the sharing of the content between the application of the plurality of client devices, and wherein the application is configured to share content from each client device when a content from the display screen is moved onto a sensitive area on the display screen. The applications, files, data and objects can be shared between remote users with a single interaction step without the necessity to repeat any setup steps to establish the communication channels and sessions. The collaboration sessions are persistent and permanently available once they are created and enable participants to collaborate asynchronously as well as synchronously. The activation and deactivation of communication channels as well as the distributions of notifications happens autonomously based on contextual cues received. The plurality of natural user interfaces like eye tracking, face detection, face, gesture and voice recognition and natural language processing enable the users to interact with the system using natural interactions. The system enables multiple client devices to share application windows simultaneously with each other on a joint canvas. The system enables client devices to interact with local application windows as well as shared application windows on a joint canvas simultaneously. The system is device and operating system agnostic as the sharing infrastructure of individual windows allows a remote user to work with shared applications which might be executed on and streamed from a different device type or operating system without any limitations. The system engrains various unique ways of augmentation of shared information, through the continuous image analysis of application video streams, to be able to overlay it with text in situations with low bandwidth where the transmission of image data would result in a delayed transmission.

In another embodiment, a non-transitory computer storage medium which stores an executable code module that directs a client computing device to perform a process comprising specifying a sensitive area within a local display window connected to the client computing device, dragging local content residing on the computing device into the sensitive area for transmission to a remote shared application window executing on a remote computing device, wherein the display window is simultaneously displaying a local shared application window displaying both local content dragged into the sensitive area and received remote content video streamed executing on a remote computing device. The sensitive area may be an application window which may be moved or resized by a user. The local content executing on the computing device may be viewed and controlled by means of the remote shared application window using keyboard, mouse, or touch interactions, wherein keyboard, mouse, and touch commands executed on the remote computing device are transmitted to the computing device to modify the local content. The local content may be shared with the remote shared application window when the content is dragged and only parts of it touch the sensitive area. The local content may be shared with the remote shared application window when the content is dragged and majority of the local content covers the sensitive area. The remote shared application window will continue to display the local content if the local content is simultaneously executing on a virtual computer in the event that the computing device is turned off.

In yet another embodiment, a frictionless cloud-based virtual collaboration system, the system comprising a virtual collaboration window configured to allow a user to drag a native content into the virtual collaboration window, wherein the native content will be displayed to the user and video streamed to at least one remote virtual collaboration window when the virtual collaboration window detects that the native content has been moved by the user from a display window to overlap with the virtual collaboration window and decode and display a remote video stream of remote content received from a server module sourced from a remote virtual collaboration window detecting the remote content having been moved by a remote user from a remote display window to overlap with the at least one remote virtual collaboration window. The display window permits the user to continue to use a plurality of other native applications on their respective display screens without sharing the native application in the virtual collaboration window. The virtual collaboration window may be further configured to execute continuously on a local computing device to continuously track overlap between a plurality of native application windows and the virtual collaboration window on a two-dimensional display canvas. The native content and the remote content can be executed remotely on a server and the system allows the user to reconnect to a previously disconnected shared session and continue to interact with the native content or the remote content displayed within the virtual collaboration window. The frictionless cloud-based virtual collaboration system further comprising a virtualization module to allow the native content to be transferred to a remote device associated with the remote application window, wherein the remote device will continue to execute the native content after transfer in the event that the native content associated with a local device is no longer running on the local device.

Other features and advantages of the present invention will become more readily apparent to those of ordinary skills in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a Virtual Collaboration and Computing Platform which provides an interactive and adaptive shared application window configured with a simplified setup, operation and interaction interface. The descriptions below include components, features and functionality of an integrated Virtual Collaboration and Computing Platform to enable the frictionless collaboration, communication and exchange between users of various digital devices, e.g. desktop computers, tablet computers, digital watches, augmented reality devices, virtual reality devices and/or phones. It enables them to interact in a natural, intuitive manner and it also enables them to collaborate with software applications in the cloud, even if these were previously only available on their local devices. The Virtual Collaboration and Computing Platform is a cloud-based computing environment which can be used by users concurrently, asynchronously and synchronously.

The Virtual Collaboration and Computing Platform is specifically targeted at internet users and collaborators to share and interact with windows/applications and files and to communicate via different channels, with a focus on usage scenarios with concurrently connected users who interact frequently with the same participants.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
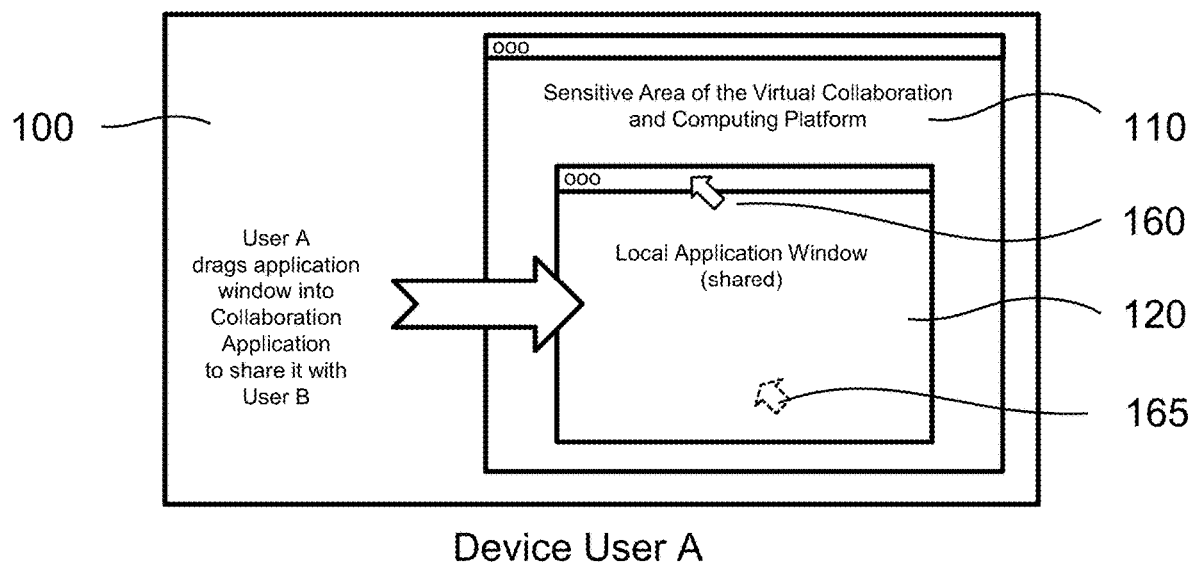
FIG. 1 is an illustration of a Virtual Collaboration and Computing Platform with a sensitive display area which can be used to share data and to represent shared data (e.g. application windows), according to an embodiment of the invention.
Figure 1:
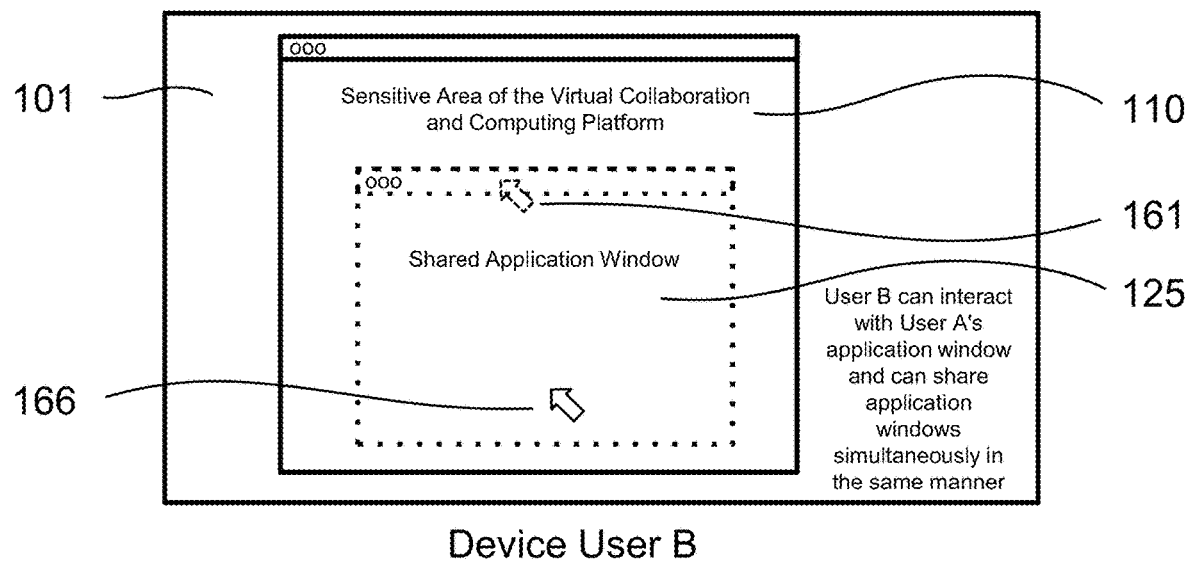
Figure 2:
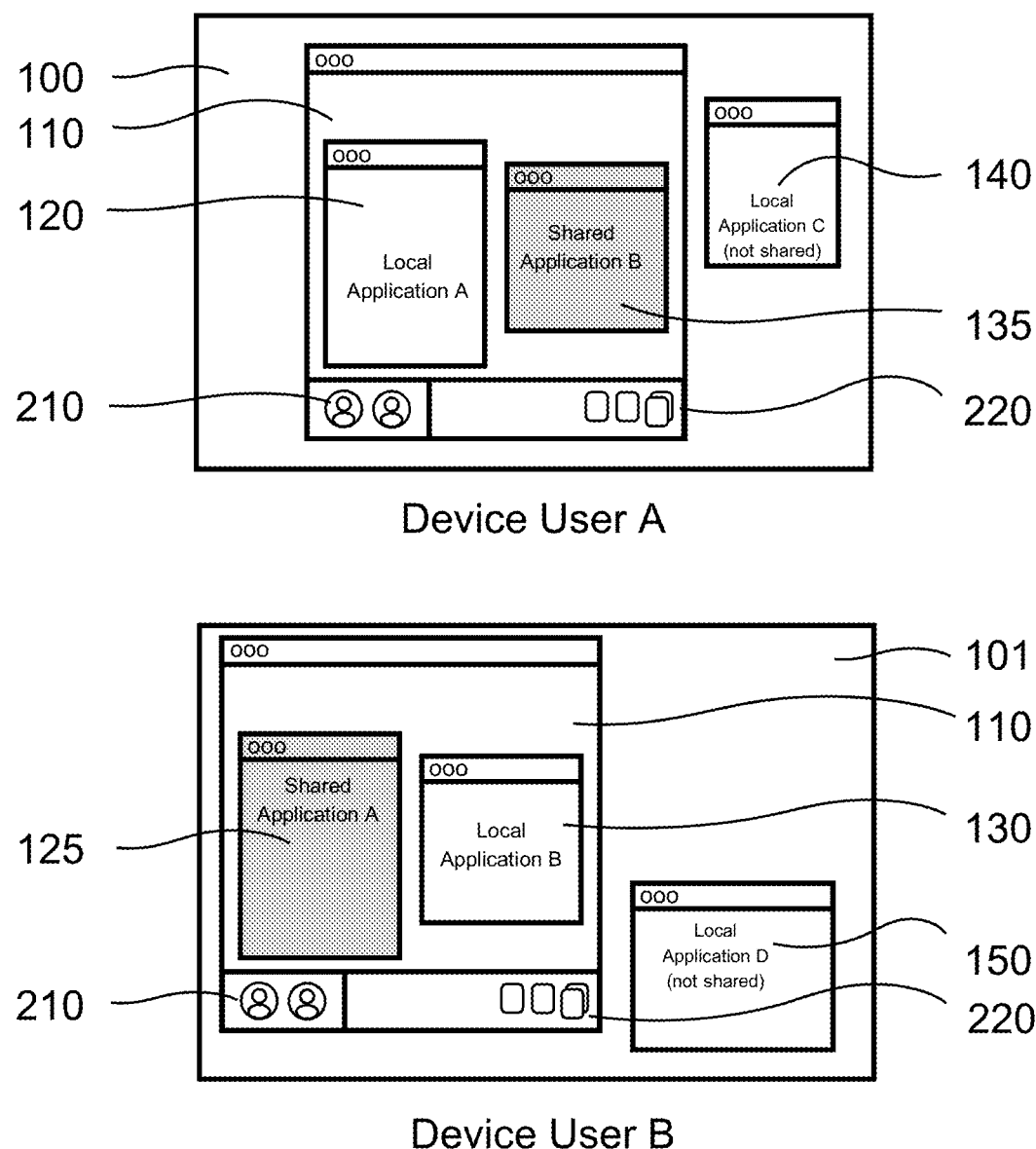
FIG. 2 is an illustration of two devices with separate virtual collaboration applications displaying shared applications, according to an embodiment of the invention.

[A] Frictionless Interface for Virtual Collaboration, Communication and Cloud Computing The embodiments described herein center on the use of a cloud-based Virtual Collaboration and Computing Platform which creates application windows on individual user devices which display only selected applications on a user's machine or portions of a user's display. One embodiment of a virtual collaboration window is illustrated in FIG. 1, where in User A computing environment 100 shares local application window 120 with User B in an intuitive manner simply by moving the local application window 120 into Sensitive Area 110 of the Virtual Collaboration and Computing Platform. User A may view the local mouse point of User A 160 and the remote mouse pointer of User B 165 as shown in FIG. 1. Then User B computing environment 101 can instantly view and control the shared application window 125 from User A, e.g. using keyboard and local mouse pointer of User B 166 or touch interactions and User B can also see a remote mouse pointer 161 shared by User A. Complementary capabilities like video feeds 210 from the users' webcams and shared file repository 220 are also represented in FIG. 2.

On one embodiment of the disclosure, the Virtual Collaboration and Computing Platform may allow two or more devices to share content within a Sensitive Area 110 of the Virtual Collaboration and Computing Platform in using a Client Server Architecture wherein a Server is used as an intermediary to share content between multiple client computing device.

In another embodiment of the disclosure, the Virtual Collaboration and Computing Platform may allow two or more devices to share content within a Sensitive Area 110 of the Virtual Collaboration and Computing Platform by using a peer-to-peer Architecture wherein a Server is not used as an intermediary to share content, but rather multiple client computing devices share content with one another directly.

The users of the Virtual Collaboration and Computing Platform might also be able to change the context and with it their communication partners by switching between different sessions within the Virtual Collaboration and Computing Platform. These sessions might be available permanently, even if not used, and could represent certain purposes, e.g. projects, teams, spaces and groups of communication partners, and could be customizable with regards to enabling capabilities and appearance. They could also be selected or proposed automatically by the platform, e.g. based on the current time and by looking up the remote meetings in the users' Microsoft Exchange calendars.

In one embodiment, when each user wants to share an application using the cloud-based Virtual Collaboration and Computing Platform, they will simply drag the application window of that application into the Sensitive Area 110 of the Virtual Collaboration and Computing Platform (also referred to as the Collaboration and Communication Platform Window), where it will then be displayed within the Virtual Collaboration Window of both User A's device and User B's device. As shown in FIG. 2, Local Application A 120 executing within computer environment 100 (which is native to User A's device) is visible in the Sensitive Area 110 of the Virtual Collaboration and Computing Platform of User A and shared within the Sensitive Area 110 of the Virtual Collaboration and Computing Platform of User B as a video stream as if it were a local application. Similarly, Local Application B 130 executing within computer environment 101 (which is native to User B's device) is visible in the Virtual Collaboration Window of User A and shared using the Virtual Collaboration Window of User A as Shared Application B 135.

Meanwhile, each user can continue to use individual applications on their respective display screens without sharing those applications in the Virtual Collaboration Window. For example, Local Application C 140 on User A's device is not shared, nor is Local Application D 150 on User B's device shared.

The system could detect the position of the local application windows relative to the sensitive area manifested by the Virtual Collaboration Window using CGWindowList, which is hereby incorporated by reference, when implemented for the Apple Mac OS X operating system. By letting it operate continuously on the local device it could track the coverage by measuring the boundaries of the application windows relative to each other on the two-dimensional canvas and even across multiple physical displays.

The Virtual Collaboration Window also may provide additional capabilities, such as video feeds 210 from the user's webcams, lists of shared files 220 or other data objects, session information, users, etc. It might also be resized to cover parts or the entire screen of a device.

The Sensitive Area 110 of the Virtual Collaboration and Computing Platform could be implemented as a native desktop application, e.g. on Apple OS X (e.g. using Objective C or Swift), or other operating system (such as, Windows OS) using other programming languages (e.g. C#, Java, etc.). The sensitive area desktop application could run continuously in the background on the computer (e.g. implemented as a Mac Login Item), but potentially never minimized so also always visible in the background behind all other windows and could permanently track certain conditions and activities on the device. In addition, the sensitive area desktop application could augment current collaboration session by showing the video feeds of remote users, information on who is currently collaborating or speaking, as well as uploaded objects.

Users could manipulate the size of the window as well as move the window around to indicate a different area of the desktop to be sensitive to share windows. In addition, it could be snapped to the border of displays or other applications.

A service could run continuously as a background process on the computer e.g. to track the position and focus of all application windows on the computer, relative to the application window representing the sensitive area.

Figure 5:
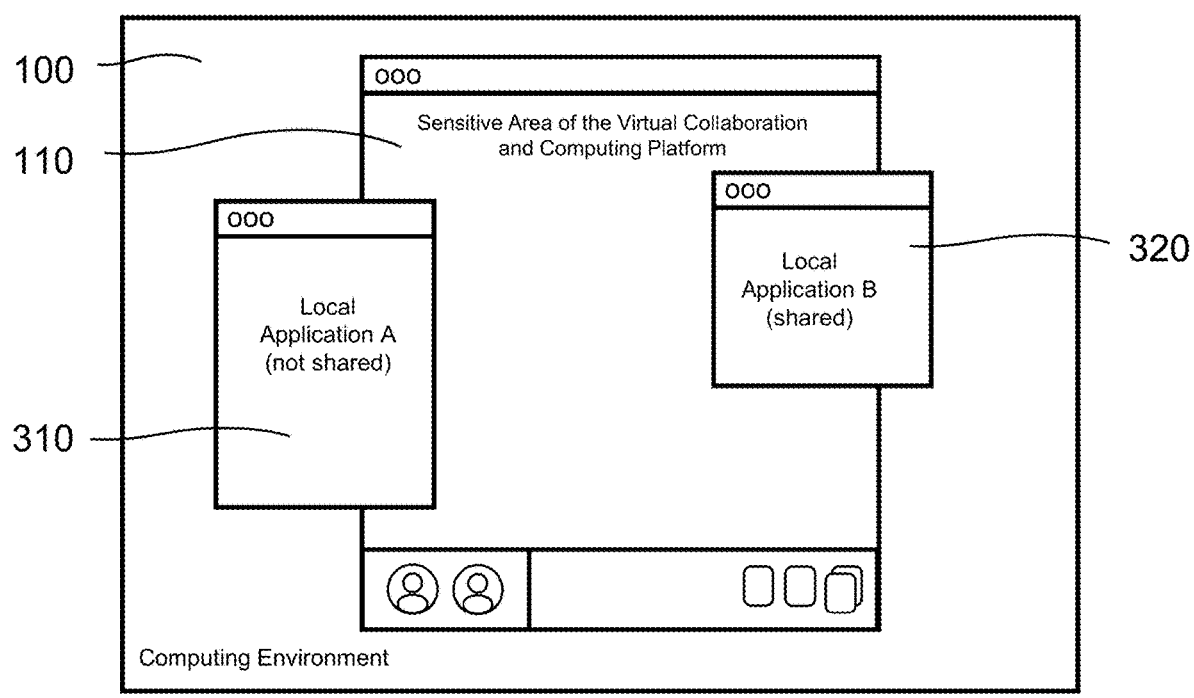
FIG. 5 is an illustration of application sharing using the Virtual Collaboration and Computing Platform, according to an embodiment of the invention.

The logic of the virtual collaboration, communication and computing platform could be defined in way that a window is always shared whenever the majority of it would be entering the sensitive area (see FIG. 5).

The necessary trigger to share the window could be that at least 50% of the window to be shared needs to cover the sensitive area represented through the platform application window, calculated by relating the absolute window size to the size of the overlapping area. The size of the overlapping area could be calculated by multiplying its width and height. Based on the definition, that the top left corner of the display has the coordinates X equals 0 and Y equals 0, the width of the overlapping area could be calculated by the smaller X coordinate of the bottom right corners of the two windows (e.g. determined using the NSWindow class), minus the bigger X coordinate of the top left corners of the window. The height of the overlapping area could be calculated by the smaller Y coordinate of the bottom right corners of the two windows, minus the bigger Y coordinate of the top left corners of the window. The size of the window potentially to be shared could be calculated by multiplying its width with its height.

An alternative trigger could be that the window is shared if it covers more than 50% of the sensitive area. This could be calculated by relating the size of the overlapping area to the overall size of the sensitive area, which could be determined by multiplying its size and width.

The service could continuously monitor whenever a window would need to be shared or unshared, based on their overlap with the sensitive area.

The service could also take into account which windows are supposed to be shared based on if they are displayed in the foreground of the desktop or even minimized. In any case windows have operating system properties designating their size and position so they could be shared even if they would be minimized or hidden behind another application.

In one embodiment of the disclosure, wherein User A is sharing an application with User B. The process begins with User A may move his mouse pointer on the header of an application window, press the mouse button and keep it pressed while moving the window into the sensitive area represented by the application window of the virtual collaboration, communication and computing platform.

Once the majority of User A's window would cover the sensitive area, the service of the virtual collaboration, communication and computing platform which continuously monitors the location of windows relative to the application window of the platform would trigger the sharing of User A's window and inform the server about the intention to share.

The server instance could determine the intended recipients of the video stream based on the metadata sent by User A (e.g. via the WebRTC RTCDataChannel) as well as the context of the participants, e.g. their historic interactions. It could determine the availability of communication channels between the parties including the resolution of their private and public IP addresses as well as existing proxy configurations by leveraging technologies like Interactive Connectivity Establishment (ICE), Session Traversal Utilities for NAT (STUN) or Traversal Using Relays around NAT (TURN).

If it would be able to initiate a direct connection between User A and User B, it would inform them accordingly about each other's connection details so that from then on the communication would no longer have to flow through the server, but directly, peer-to-peer (P2P) between clients, so that all clients would communicate with each other in a full mesh topology.

The server could determine the optimal video quality for the intended recipients based on analyzing their bandwidth during session initiation and during the individual collaboration sessions (e.g. using the WebRTC getStats( ) API) and by transcoding the content prior to submission, e.g. possibly even acting as a SFU (Selective Forwarding Unit).

The virtual collaboration, communication and computing platform could then start to capture the content of the application window to be shared (e.g. via getUserMediaO) directly from the graphics controller or window handler of the operating system, encode the individual frames as a video stream using codecs like H.264, VP8 or VP9 and send it to the server instance together with meta data (e.g. screen resolution, window position, session ID, etc.).

User B's device could subsequently receive the video stream of the shared application window in real-time. The same platform application on User B's device could analyze it and its metadata, create an application window (e.g. using the NSWindow class) at the same relative position on screen (e.g. using setFrame:display:) and display the video stream from User A in this window with the appropriate size (e.g. by referencing the stream via createObjectURL( )) so that it is visualized as if it would be a local application being executed on User B's device.

Other collaboration solutions do not enable users to show remote and local application windows in the same view at positions and with sizes which are relatively the same for all connected users.

This capability could be provided by the platform described herein, even if users have different screen resolutions. This could enable users to interact with remote and local applications coherently and without a noticeable difference between them in terms of user interactions.

As long as the displays' width to height ratio is similar across all connected clients, the windows would be positioned by the platform application at the same relative location (e.g. X at 5% of absolute screen width and Y at 12% of absolute screen height). If the display's width to height ratio is different across different clients, the system could offer alternatives how to visualize the windows' dimensions. Similar to the case of consistent resolution ratios, the width would be calculated and applied relatively to the absolute width of the display of the sharing user.

For the height of the window it could either get the same ratio of the entire screen of the sharing user or it could alternatively get the ratio of the relative height of the shared window. Another alternative would be to show the windows on an infinite canvas where users could scroll unlimitedly to either of the four sides of the initial canvas, with windows being displayed in their original size and dimensions.

User B could interact with the window using native desktop interactions, e.g. using mouse and keyboard.

In parallel to window sharing and collaboration aspects the participants of the same sessions could also communicate with each other by audio and video transmitted via dedicated channels (e.g. also using getUserMedia( ) to access data from connected devices like a webcam).

As soon as mouse pointers or directing interactions like through a finger on a tablet move into the sensitive area represented by the application window of the virtual collaboration, communication and computing platform on User A's device, it could be made visible at the same relative location to the other connected parties.

From an implementation perspective, the background service of the platform application could continuously track the position of pointers on the client (e.g. using NSEvent mouseLocation) and if the coordinates are within the sensitive area represented through the platform application window (e.g. determined via NSWindow), the coordinates as well as the context (e.g. left click, right click, scrolling with a mouse wheel, session context) could be transmitted to the server via the data channel (e.g. in the JSON format).

The server could determine to which connected clients the information would need to be transmitted and do so subsequently. While the information of pointer-related interactions could be transmitted to all users in the same session and visualized accordingly, activities like clicking would only be applied on the device which is sharing the window under the pointer. As an example, if the mouse pointer of User B is hovering over a window shared by User A with User B, the actions of User B (e.g. like mouse clicks) could only be applied on User A's computer, e.g. by applying executing a click (e.g. using CGEventCreateMouseEvent) on User A's computer at the same location of User B's pointer when User B is clicking. This would enable remote users to interact with remote windows as if they were local, native application windows.

Similarly keyboard interactions could be captured (e.g. using addGlobalMonitorForEventsMatchingMask:handler:), transmitted (e.g. in the JSON format) and could also only be injected on the device which is sharing the application window which is currently in focus on the platform (e.g. determined using keyWindow in NSWindow).

Figure 3:
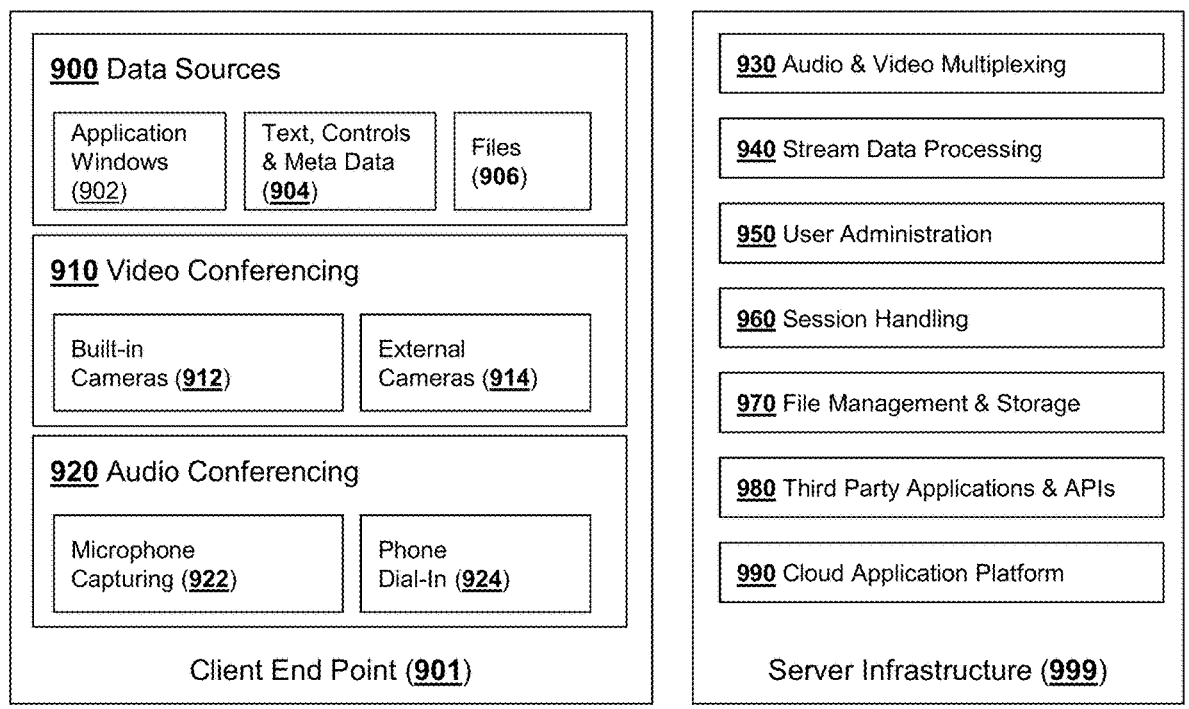
FIG. 3 is a block diagram illustrating client-end components and server-end components of the Virtual Collaboration and Computing Platform, according to one embodiment of the invention.

FIG. 3 illustrates an embodiment of a client endpoint and server infrastructure on which the Virtual Collaboration and Computing Platform may be executed. The various types of components and data which may be shared and displayed at the client endpoint 901 are listed, and may include data sources 900 (such as, application windows 902, text, controls & meta-data 904, or files 906), video conferencing 910 (such as, built in cameras 912, external cameras 914) and audio conferencing 920 (such as, microphone capturing 922, phone dial-in 924). The server infrastructure 999 may coordinate and control the virtual collaboration windows and the overall session through audio and video multiplexing 930, stream data processing 940, user administration 950, session handling 960, file management 970 and storage, third party applications 980 and APIs and cloud application platform 990.

Figure 4:
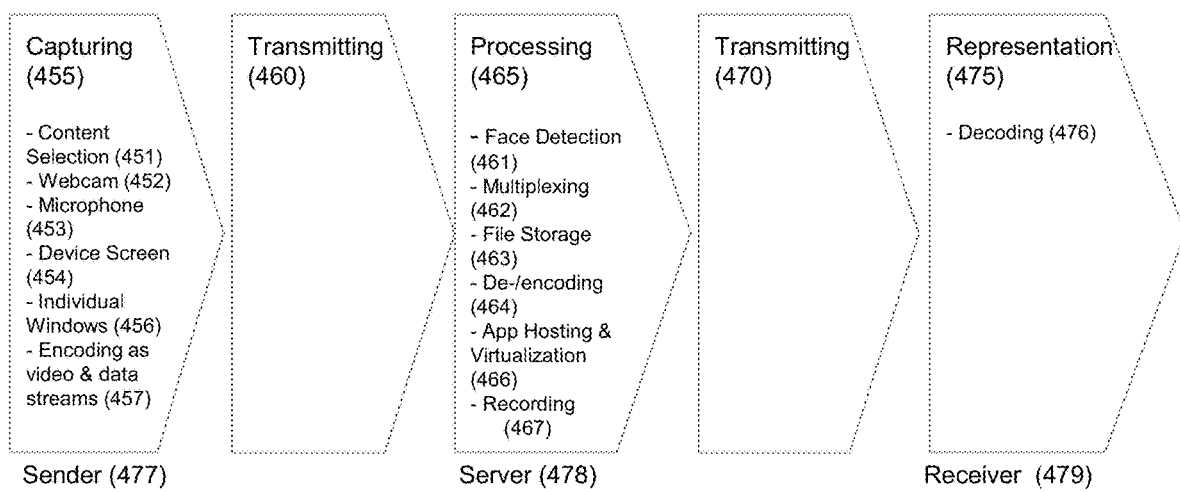
FIG. 4 is a flow diagram illustrating an example process for communication and collaboration between two users of the Virtual Collaboration and Computing Platform, according to an embodiment of the invention.

FIG. 4 illustrates an example process for communication and collaboration from a sender to a receiver using the cloud-based Virtual Collaboration and Computing Platform. At the sender device 477, information such as content selection, video from a webcam, audio from a microphone, the device screen, individual application windows, encoding as video and data streams are captured 455 (wherein capturing 455 may include: content selection 451, webcam 452, microphone 453, device screen 454, individual windows 456, encoding as video & data streams 457) and transmitted 460 to the server 478 for processing 465 (wherein processing 465 may include: face detection 461, multiplexing 462, file storage 463, decoding/encoding 464, application hosting & virtualization 466, and/or recording 467). The server 478 then transmits 470 the processed information to the receiving device 479, which handles representation 475 which may include decoding 476 and displays the shared content to the user on the receiving end. For certain data streams, e.g. WebRTC, video, sound or user commands, a direct peer-to-peer connection may also be used as a carrier of information.

The server 478 may additionally perform the follow functions in relations to the virtual collaboration system, (1) Audio & Video Multiplexing: potential transcoding and optimization of transmitted video and audio streams for participants based on their settings, capabilities and bandwidth, (2) Stream Data Processing: processing of transmitted data, e.g. to enrich video streams with metadata (e.g. faces recognized in videos using computer vision algorithms executed on the server), (3) User Administration: user profiles & authentication, (4) Session Handling: managing which users are members of which sessions and which are active in which session, ICE/STUN/TURN handling to be able to connect users with each other, (5) File Management & Storage: platform to store and make files available to users, (6) Third Party Applications & APIs: providing 3rd party developers with capabilities to build application on the platform using an IDE (Integrated Development Environment), release management components as well as a store-like environment to make solutions available to other users, the ability to provide platform capabilities to 3rd party applications via public APIs, e.g. to calculate & reward contributions or to exchange payments or other objects, (7) Cloud Application Platform: execution of applications on the platform, e.g. natively cloud-based applications, but also applications potentially moved from clients to the server infrastructure (e.g. within virtualized containers).

After a client workspace in a screen sharing session has been closed and restarted, its visual layout and functionality could be re-established, e.g. if a client software or whole system is re-launched by the user or the system.

When re-establishing the workspace an application could automatically re-launch and share the previously shared applications and windows.

When re-establishing the workspace an application can prompt a user of a necessary action to re-establish a sharing session equal or close to equal to the previous one.

The automatic re-establishment could automatically occur each time a user starts his/her computer.

The workspace could also be persistent by nature, to ensure that certain session parameters like invited users, shared files and data would always be available, even if no user was logged in. This would enable users to collaborate and communicate in an asynchronous and yet natural manner, like working sequentially on printed documents which were left on a table in a meeting room.

[B] Sharing of Applications, Data and Objects in a Virtual Collaboration Environment The outlined cloud-enabled platform tightly integrates information sharing, e.g. file sharing and screen sharing, with control sharing, e.g. mouse, keyboard and gestures, and communication channels, e.g. video (e.g. from webcams), audio (e.g. from microphones connected to a computer), image, text-based data-interchange formats (e.g. html, xml, JSON) and text. It could enable asynchronous as well as synchronous communication between communication partners.

In one embodiment, the activation and deactivation of the communication channels could be tightly coupled with collaboration activities, e.g. only when a screen is shared or when a mouse is moving would the audio or video signal from remote participants be transmitted.

The Virtual Collaboration and Computing Platform could also mimic physical, natural interactions to enable its sharing processes, e.g. translating the exchange of papers between colleagues located right next to each other at the same table into the digital world by enabling them to share information as soon the information elements they want to share (e.g. documents) cover certain sensitive areas of their digital work environment. Instead of clicking on buttons to activate sharing processes, users would just need to apply natural gestures to do so.

In one embodiment, content which is shared could appear on the users' devices if they have installed the necessary native software application or on its web-based equivalent, where a website could have a unique URL dedicated to this specific collaboration and communication session. The content could also appear automatically on private or access-controlled websites which could be displayed on any device, e.g. public TVs, laptops, phones and stationary computers, and the corresponding audio data could also be transmitted and played on the recipient's terminal.

The system could also react dynamically to the nature of the sender and recipients' end points. If certain recipients are not able to display video images due to an incompatible form factor of their device or due to limited capabilities of their devices or bandwidth, the intermediary server architecture could adjust the shared data so that it could be consumed by all recipients. For example, the key image data could be converted into text which could be supplied to these specific recipients, fewer image frames could be sent to them than to the other recipients or in a lower resolution.

Similarly the system could indicate to the sender how well the data is received and how it is consumed by the receiver, e.g. by analyzing the audio and video quality on the receiver's end (e.g. missing frames, latency, resolution, echo, bandwidth, compression, CPU load, memory consumption, delay between audio & video) or even local parameters like volume, settings, technical parameters (e.g. stack versions), focus on other application windows, attention of the user to the stream (see below), etc. This would address shortcomings of today's real-time collaboration solutions, where users have to keep asking each other "Can you see/hear me?", "Can you see my screen?" or on the other end "Sorry, I can't see/hear you", "Are you on mute?", "Sorry, you're breaking up", "I can't see your screen", "Are you sharing anything?", etc. These frustrating exchanges would no longer be necessary and users could focus on the content of their collaboration sessions.

The users could be informed about the status of the remote users, depending on if the users are online on the platform, in the same collaboration session, if their webcam is enabled and if they are actively interacting on the platform.

As an intuitive way to share digital information with remote participants it could be transmitted automatically as soon as the information to be shared covers a certain sensitive part of the screen of the sender's device, for example another application window designed to be the sensitive area for sharing or another graphical element of the underlying operating system.

The same concept could apply to sharing application windows, audio, video feeds, textual information and text-based data-interchange formats. As soon as they cover the sensitive area they could be transmitted automatically and could be digitally recreated on the recipients' terminals.

From an implementation perspective the sensitive area could be a window in case of a desktop operating system, which could be moved and resized by the end user. Any other window which covered this window would be shared. In one embodiment illustrated in FIG. 5, in a situation where only parts of it would be covering the Sensitive Area 110 of the Virtual Collaboration and Computing Platform, also only these parts could be shared in the case of visual and textual information—or it could also be shared entirely. It could also only be shared if at least the majority of it covered the sensitive area, as illustrated in FIG. 5 when comparing the window within a computing environment 100 for Local Application A 310—which is only partially covering the Sensitive Area 110 of the Virtual Collaboration and Computing Platform—and Local Application B 320, which is mostly covering the virtual collaboration window. In this embodiment, Local Application A 310 would not be shared, while Local Application B 320 will be shared.

Similarly, audio data could be shared, i.e. if a media player were playing an audio file on the sender's side and the application window of the player generating the audio output was moved into the sender's area.

In case a window with video playback only partly covered the sensor area, the related audio data could only be transmitted if the majority of the window covered the sensitive area, otherwise it could play silently on the recipients' end.

Figure 6:
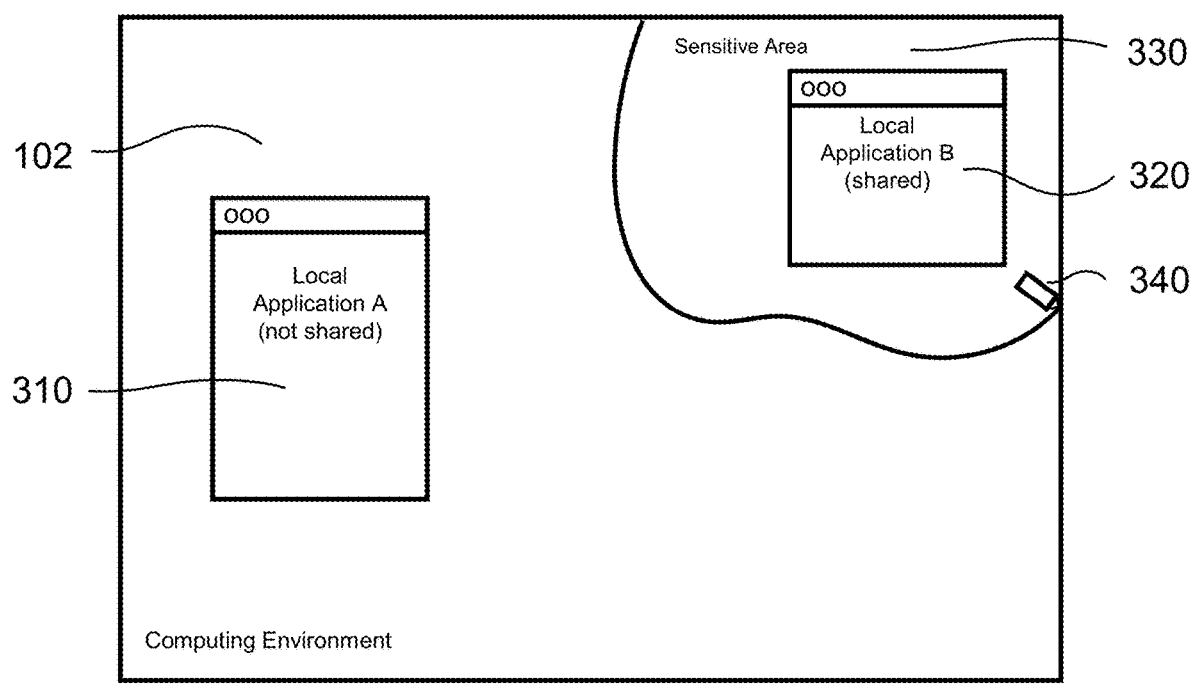
FIG. 6 is an illustration of a manual selection tool for creating a sensitive area to share data (e.g. application windows), according to an embodiment of the invention.

Users could use gestures using their fingers or mouses to denominate screen areas to be sensitive and/or content to be shared using e.g. Polygonal Lasso Tool 340 which is commonly used in image editing applications. FIG. 6 illustrates one embodiment of the manual selection or lasso tool 340, where a user can manually select a configurable sensitive area 330 of the display screen 102 encompassing Local Application B 320. As a result, Local Application B 320 is video streamed to at least one shared application window, and the configurable sensitive area 330 may allow other content (not shown) such as local files, or other applications, such as Local Application A 310, to be dragged into it at any point in time and be shared.

In terms of implementation the windows to be shared could be captured on a frame by frame basis using the CGWindow API of the Apple Mac OS X Operating System, which is hereby incorporated by reference, then compressed into the H.264/MPEG-4 AVC format, which is hereby incorporated by reference, to ensure high image quality while limiting the required bandwidth to stream the data in real-time over the internet by leveraging the Real-time Transport Protocol (RTP), which is hereby incorporated by reference.

In a similar manner, to encode and distribute the audio signal captured from the microphones of the end users the opus codec, which is hereby incorporated by reference, could be used to provide high audio quality in real-time over the internet.

To enable communication partners to also exchange data through heterogeneous network environments via the internet, STUN (Session Traversal Utilities for NAT) and TURN (Traversal Using Relays around NAT) servers might be used to handle sessions, messaging, connections and data transfer.

The server infrastructure of the Virtual Collaboration and Computing Platform could be hosted in the internet with load balancing capabilities to be able to deal with varying amount of connections between users. In a software-as-a-service model users could be able to acquire licenses to use the solution for limited and potentially recurring amounts of time. Access and license restrictions could be checked centrally on the backend infrastructure. The backend services could also support the storage and management of user sessions, recorded and live video streams as well as files and transactions. Data transfer could be handled via the RTC-DataChannel, which is hereby incorporated by reference, to be able to provide a low latency end-to-end connection based on API methods like getAudioTracks( ) and getVideoTracks( ) via MediaStream and getLocalStreams( ) via RTCPeerConnection.

From an end user perspective, but also an implementation perspective, the described system could also operate mostly independent from the operating systems of the communicating users, from the type of their devices or even from the applications they use and share. So no matter which OS, device or applications a user uses, remote users with an entirely different setup might be able to interact with the remote data and content in an entirely agnostic manner.

As an underlying foundation for the software client for the collaboration partners the cross-platform shell Electron, which is hereby incorporated by reference, or NW.JS frameworks, which is hereby incorporated by reference, could be leveraged to expose operating system-independent functionality built in JavaScript within native applications to simplify its implementation and to ensure wide interoperability. The platform could also be used to capture the content of the windows to be shared, to encode the image information and to decode and represent it after transmission.

Content could also be shared automatically when a certain predefined or automatically determined context existed, demonstrating their implicit intention—i.e. the presence and/or activity of certain individuals, their presence in combination with their activity, the location of a certain activity or individual.

In a similar manner audio and video information could be multiplexed according to its context. So only if users were active, determined by tracking their activities on their devices, their presence in the context of the collaboration solution, their video and/or audio could be transmitted to remote parties to avoid transmitting irrelevant information and to ensure privacy of the participants.

As an example for approaches based on Feature Recognition methods 820 to trigger notifications and to respond to them, computer vision algorithms could be used to determine if users are facing the camera of their device which would run the collaboration solution. This could be used as an indication that they might be engaged, and if they were not facing the camera for more than a certain timeframe, e.g. 15 seconds, their video transmission could be paused or hidden. As soon as they look back into the camera, the video could be transmitted and played again in real-time and automatically.

Faces and even eyes of the users could be detected by leveraging the OpenCV programming library and Haar feature-based cascade classifiers, which is hereby incorporated by reference, by analyzing the image information provided by the webcam feeds of the participating users. The analysis could be done on the central cloud platform to keep the process lean and to limit the load on the client side.

In a similar manner the audio signal could also only be transmitted if the users faced the camera or the microphone by using acoustic source localization methodologies to determine the location and angle of the users via the microphone, which is hereby incorporated by reference.

Users could also use Manual Triggers 800 and as an example voice commands to initiate certain activities or to respond to certain notifications. E.g. if a user shared her screen and the corresponding notification was presented to a remote user, this user could simply say "join" into his microphone during a certain timeframe after the notification arrived, e.g. 10 seconds, to join the session, to watch the shared windows and to communicate with the sender.

For example, the NSSpeechRecognizer API, which is hereby incorporated by reference, of the Apple Mac OS X Operating System could be used to identify the relevant command in a contextual manner, based on pre-specified terms and via the method 'speechRecognizer: didRecognizeCommand' the corresponding activity relevant to the situation could be executed.

In a similar manner, users could leverage gestures, e.g. to show a 'thumbs-up' gesture into the camera to acknowledge the receipt of a notification, to join a sharing session instantly and/or to trigger a positive notification to the original sender.

Gesture recognition capabilities could be provided by leveraging the OpenCV API, which is hereby incorporated by reference, to extract the background using the cv:: BackgroundSubtractor class' and then the contours of e.g. the user's hands by leveraging the 'findContours' function.

[C] Contextual Processing and Concurrent Control of Shared Data on a Virtual Collaboration Platform The Virtual Collaboration and Computing Platform could sense and react autonomously depending on the type of shared content. I.e. if a browser window would be shared between two remote participants as a live-feed from the sender's device to the recipient's device, the system could analyze the shared content and automatically extract relevant information, in this case for example the URL which would currently be open in the browser. This URL could be automatically stored on the cloud platform to track the collaboration history in a more fine-granular detail, to process the URL automatically in various ways or also to provide the recipients with the possibility to open the URL directly on their local devices instead of viewing the content via screen sharing. In a similar manner, if a window of a music player is shared by a user to one or more recipients, the played music could automatically be added to a cloud-based playlist.

Shared content (e.g. screencasts), control activities as well as all communication data (e.g. image, text, text-based data-interchange formats, audio and video) could be recorded automatically by the platform in an intelligent manner, e.g. only if changes to the shared content were happening would they be captured, e.g. frames of live-feeds would only be captured if they were changing. In a similar manner shared textual information could be captured as an image/video and combined with other related information. Consequently, users could replay these recordings by using captured meta information like certain activities to consume the replay, i.e. as markers in a video replay.

The collaboration and communication platform could also integrate various additional and 3rd party information sources. For example, it could combine and relate information shared by its users with information from public sources. As an example, if certain software IDE (Integrated Development Environment) applications were presented to remote participants using screen sharing, the platform could automatically augment this information by displaying the latest changes from the corresponding development repository stored on a private or public cloud environment like GitHub. The data could be retrieved using the native client on the sender's side and it could be analyzed continuously on the cloud platform, also by correlating information from multiple senders.

Video streams could also be enriched with additional visual information (e.g. tags or UI elements and metadata through the central cloud infrastructure, before they would be transmitted to the receivers.

In the case of sharing textual information only entire words could be shared, as soon as at least one letter of the word covered the sensitive area.

In the case of sharing a URL it could be opened automatically on the remote sides as soon as it was shared entirely, which could be technically determined on the sender's side.

In all these cases, the ability for multiple users to work flexibly and frictionless with data shared by one user would be crucial. In one embodiment, multiple users would be able to work with multiple/different applications at the same time which would be shared on, or relayed via the cloud-based Collaboration Platform simultaneously in the same session and visualized in a combined manner. The applications could be executed on servers or clients linked to the cloud platform via APIs (Application Programming Interface).

Multiple users would be able to work with the same application which would be executed on the central cloud platform or a server or client connected to it.

Multiple users would be able to collaborate with an application using a multitude of devices and input technologies—e.g. mouse, keyboard, touch, voice commands, gestures, not necessarily with the same technologies in the same session.

Input from individual participants could be distributed to the end points and applied according to the capabilities of the target application, e.g. sequentially per incoming sequence (e.g. keyboard input). Each user could control an individual mouse pointer and if applications supported it, they could be used concurrently, i.e. to do multiple drag and drop operations at the same time or they could be applied in a sequential manner with interrupts and a certain delay.

Figure 7:
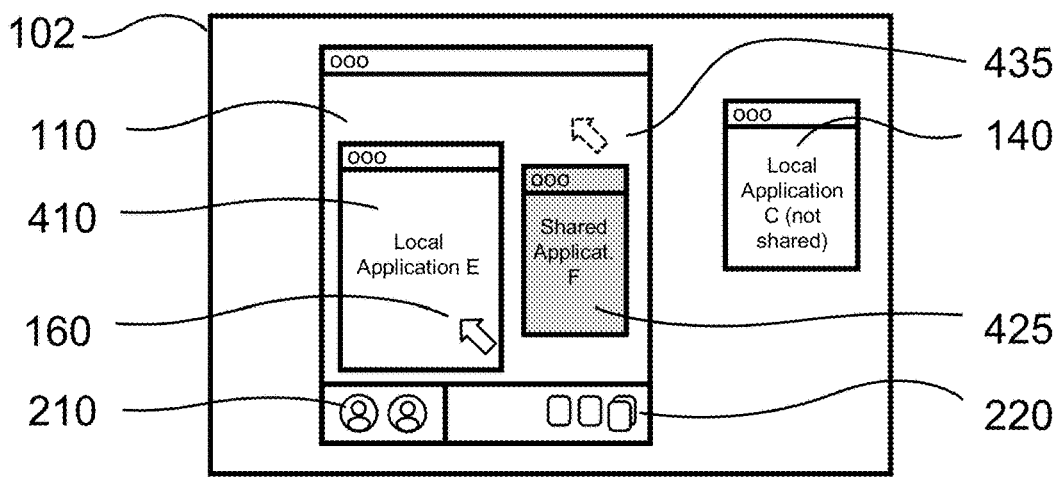
FIG. 7 is an illustration of sharing separate pointers between three users of the Virtual Collaboration and Computing Platform, according to one embodiment of the invention.
Figure 7:
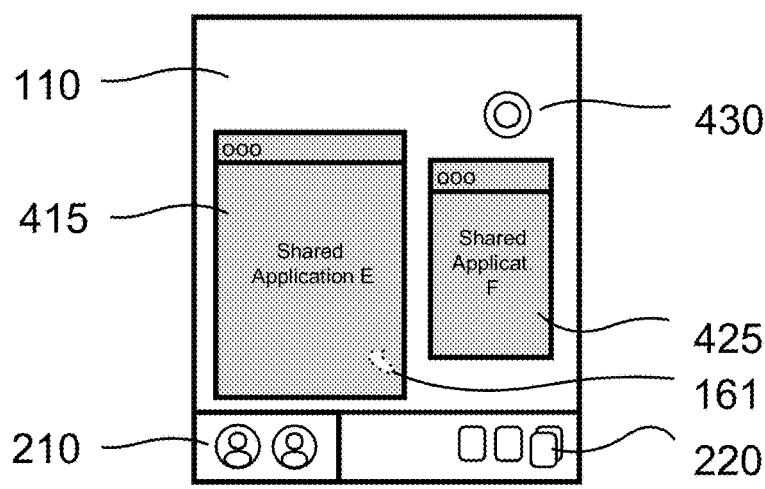
Figure 7:
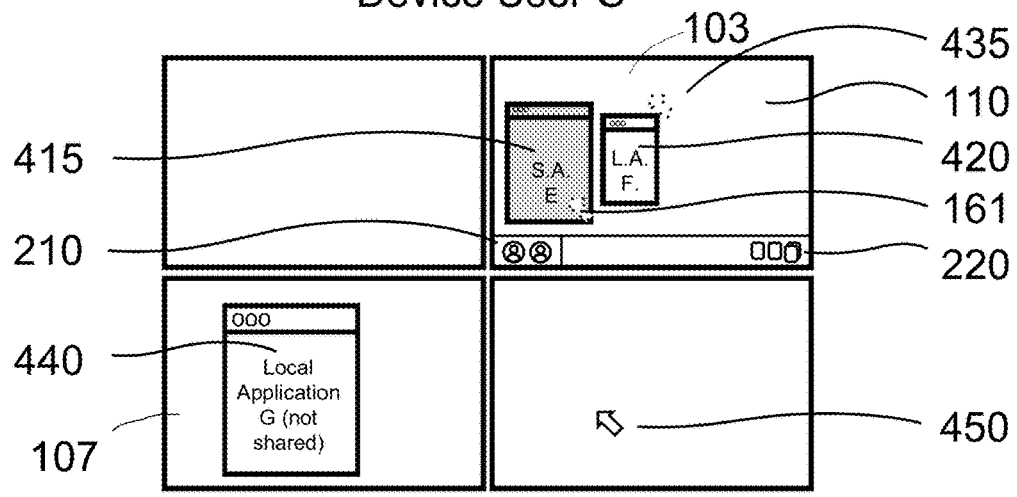

FIG. 7 illustrates multiple embodiments of the disclosure, where Device User A having display screen 102 comprising a Sensitive Area 110 of the Virtual Collaboration and Computing Platform, the Sensitive Area 110 of the Virtual Collaboration and Computing Platform comprising Local Application E 410 dragged into the Sensitive Area 110 of the Virtual Collaboration and Computing Platform by Device User A by means of local mouse pointer of User A 160 or be selected to be shared by User A, and a Shared Application F 425 shared by a Device User D. The Sensitive Area 110 of the Virtual Collaboration and Computing Platform further comprises a remote mouse pointer of User C 435 visible to Device User A within display screen 102. Additionally, Device User A's display screen 102 comprises a Local Application C 140 which is not shared because it has not been placed within the Sensitive Area 110 of the Virtual Collaboration and Computing Platform by Device User A. Complementary capabilities like video feeds 210 from the users' webcams and shared file repository 220 may also be enabled for sharing within the Sensitive Area 110 of the Virtual Collaboration and Computing Platform by Device User A.

Device User C having a Sensitive Area 110 of the Virtual Collaboration and Computing Platform is able to view the Shared Application E 415 (arising from the sharing of Device User a Local Application E 410), Shared Application F 425 (arising from the sharing of Device User D Local Application F 420), local mouse pointer of User C 430, and remote mouse pointer of User A 161. Complementary capabilities like video feeds 210 from the users' webcams and shared file repository 220 may also be enabled for sharing within the Sensitive Area 110 of the Virtual Collaboration and Computing Platform by Device User C.

Device User D having multiple display screens may elect one of the display screens as the Sensitive Area 110 of the Virtual Collaboration and Computing Platform to allow for display of shared content and local content enabled for sharing. As shown in FIG. 7 the top right screen 103 is enabled as the Sensitive Area 110 of the Virtual Collaboration and Computing Platform, wherein Device User D is able to view remote mouse pointer of User C 435, remote mouse pointer of User A 161, Local Application F 420, Shared Application E 415, and capabilities like video feeds 210 and shared file repositories 220. While on the lower left screen 107 may continue to display Local Application G (not shared) 440 because this application has not been dragged or selected by Device User A to be shared within the Sensitive Area 110 of the Virtual Collaboration and Computing Platform.

Because windows are individually shared from a technical perspective, the client can create multiple remote windows, each showing a separate video stream, independent of each other—each window is filled by a dedicated video.

The individual video streams of the shared window could be assembled by the server (e.g. a transcoding Multipoint Control Unit) to single stream to streamline the transmission to the receiving clients and then disassembled by the individual clients before the streams are visualized as remote application windows.

For local applications which are executed directly on the client devices, the entire processing state could be transferred as encapsulated data from the main memory and local hard disk within a virtual container which could be migrated to the cloud infrastructure or another client device once the user chooses so.

Applications might have to be prepared specifically for application virtualization to be able to be transferred between clients and servers of the platform.

The virtual container's data could be transmitted using the data channel, encapsulating all relevant information. Together with it the client could provide the server with relevant metadata, like the stack level of the local operating system, installed applications and other crucial prerequisites required to run the application. The server could determine which user would be able to take over the virtualized application depending on their individual setups and prevent others to do so if they would not be capable of executing it.

In the case of cloud based applications (e.g. like Google Drive or Microsoft Office 365), the applications are already running on 3rd party cloud infrastructure. Would a user transfer one of these applications, e.g. their native manifestation or in a browser window, the receiving client could automatically reopen the same application context locally (e.g. by calling the same URL with the necessary credentials), creating the impression that the application was indeed transferred, although it was previously and still is running on the 3rd party cloud infrastructure.

If certain activities were processed by a user on a local device or remotely, these could be triggering an automatic notification of relevant remote users on their devices, so if certain relevant information was shared using the frictionless information sharing platform previously described. Implicit Activities which could trigger a response might require a response by a remote user of the same group, they might just keep the remote user informed or they might also be an implicit request to interact with the other user.

Figure 8:
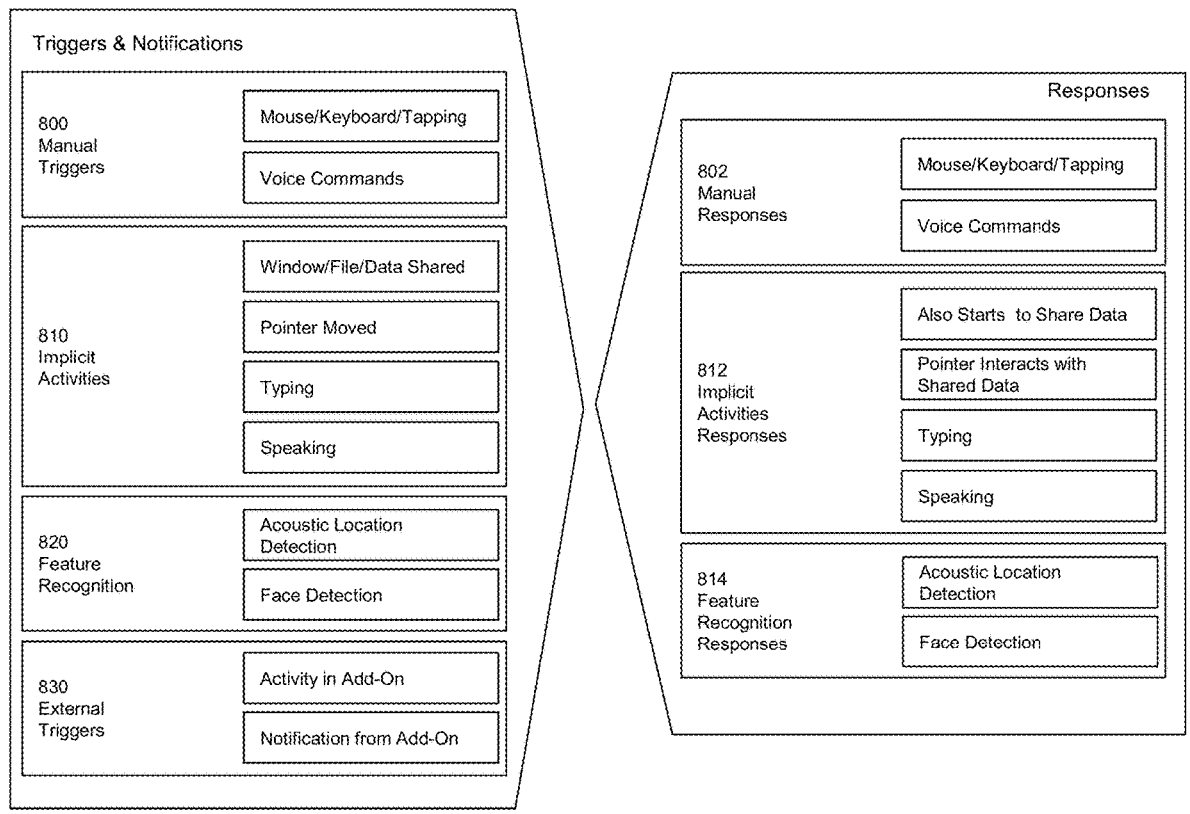
FIG. 8 is a block diagram illustrating notifications and triggers and corresponding responses in the Virtual Collaboration and Computing Platform, according to one embodiment of the invention.

FIG. 8 is a block diagram illustrating several exemplary notifications and triggers and the various corresponding responses which may result therefrom. The list should not be considered limiting.

As an example, Notifications & Triggers may comprise: Manual Triggers 800 (i.e. mouse/keyboard/trapping and/or voice commands), Implicit Activates 810 (i.e. window/file/data shared, pointer moved, typing, speaking), Feature Recognition 820 (i.e. acoustic location detection, face detection), and/or External Triggers (i.e. activity in add-on, notification from Add-on).

As an example, Responses may comprise: Manual Responses 802 (i.e. mouse/keyboard/tapping and/or voice commands), Implicit Activities Response 812 (i.e. start to share data, pointer interacts with shared data, typing, and/or speaking), and/or Feature Recognition Responses 814 (acoustic location detection and/or face detection).

As an example, if a user shared a screen, it might be an inherent request for the other prospective participants of the session to collaborate or at least to view the shared content. Therefore, they could be notified instantly and they could join the session with a single interaction, e.g. with the swipe of a finger on a tablet running the collaboration software client.

Users could also be able to notify other users manually, e.g. to request them to share content or to simply ask them to join the session.

Information from a shared application could be correlated with information which would already be available in the cloud, e.g. if a browser window was shared while playing a video, any video frame or even the entire video could automatically be captured as an image on the cloud platform, without the unnecessary information around it and/or even the URL could be extracted automatically, e.g. by image recognition or by using meta information which might be transmitted by the solution without being exposed to the end user of the collaboration environment.

From an implementation perspective the transmitted video streams could be analyzed on the client or server side using the tesseract-ocr engine, which is hereby incorporated by reference, to identify and capture the text in the video streams which could be fed into the cloud platform subsequently using the REST (Representational State Transfer) protocol.

For a shared application window, as currently shared on the Virtual Collaboration and Computing Platform, that allows for text entry a local text field may be shown, overlaying parts of the original window, as the text entry areas is active. This local text field could be used to send all entered characters in one go to the application represented by the window rather than continuously transfer a stream of characters as would be the normal state. Such a semi-concurrent entry would give the user a smoother typing experience by avoiding lag generated between the entry of a character and the return of its visual representation over the network. Such functionality could be especially useful in high latency and low bandwidth scenarios. While another user is entering text the window could be blocked for entry by any other users connected to the same workspace.

More generally any window could be temporarily blocked from entry and editing by other users when one user has activated it.

[D] Exchange of Applications, Data and Objects on an Integrated Virtual Collaboration and Cloud Computing Platform In addition to sharing video data of shared applications using screen sharing, applications could also be started on a user's local client and when they are shared they might transition to the central cloud-based Virtual Collaboration and Computing Platform and then transition again to another local client if the user decided to take it over.

Applications running on local clients would have the advantage of being independent of network connections and work could continue despite potential network outages or bandwidth shortages.

If a user saved content in an application which the screen of which was shared, the content could not only be saved locally on the user's device, but also automatically on the cloud platform or even on the other users' devices.

In a distributed scenario the move of a previously local application to the central cloud platform or to other users' devices could also be used to leverage the different nature of the same, e.g. large-scale operating power. Applications could also be moved from client to a server and then to the next server or client, simply by using the inherently intuitive interactions outlined earlier.

From an implementation perspective the applications to be operated on another device, e.g. by another user or on the cloud infrastructure, could be encapsulated in containers, e.g. based on the Docker Engine, which is hereby incorporated by reference. This would enable to run applications flexibly on different hosts, to transition between them and on different operating systems.

The Virtual Collaboration and Computing Platform could also provide a development basis for applications running directly on the platform, not initially on the local clients. Independent developers could be provided with a SDK (Software Development Kit) to develop and operate own applications on the platform and to distribute and even monetize them via an integrated marketplace.

In one embodiment, the shared workspace data connection between clients and servers could be built to limit data traffic and optimize scalability by using a REST (Representational State Transfer) architecture. The shared workspace cloud infrastructure could offer integration (e.g. notifications, information transfers, file transfers, metadata sharing) with other services through an API (Application Program Interface), e.g. based on the REST protocol.

A console-like text entry field that might allow commands to be entered by any user connected to a shared workspace of the Virtual Collaboration and Computing Platform could be used for fast adaptation of the workspace's layout, functionality and exchanged data. This would provide a very flexible and fast environment for the advanced user while occupying a minimum of screen domain when such functionality is not needed.

Console commands could allow users to define and run predefined scripts to execute a sequence of commands for adapting the workspace to a certain functionality.

The commands could also be used to communicate with the cloud-based Virtual Collaboration and Computing Platform and participating users, e.g. by using predefined commands, a combination of them or even natural language by leveraging voice recognition and even NLP (natural language processing) engines, e.g. to query certain information from the cloud infrastructure (e.g. currently active sharing sessions with certain applications), to exchange messages with other users and applications, to quickly open and execute software available on a connected client or server or to configure the integration of external applications into the platform. Using the same NLP engine, the platform could also provide the user with feedback in full sentences as text or speech output.

In one embodiment, the Virtual Collaboration and Computing Platform will also allow the transfer of objects from one user to another, where the object may be a singular virtual object such as currency, certificates, signatures, keys, credentials, etc.

For example, monetary items, e.g. currency or bitcoins, may be transferred from one user to the other by dropping it/them on a shared workspace after which the second user picks it/them up, similarly to sharing application windows as outlined in FIG. 2. The monetary transfer could happen via a direct connection to a third party monetary institute, e.g. a bank or financial institution. The monetary transfer could happen via the transfer of crypto-currency, e.g. a bitcoin, from one client to another. The monetary transfer could happen via the transfer between accounts as operated by the supplier of the virtual collaboration solution.

In one embodiment, the Virtual Collaboration and Computing Platform could also calculate the contribution of each team member or group of members—for example by analyzing the content shared, presence and content updates.

By quantifying the level of contribution, users could be rewarded or credited via monetary compensation, rewards, points or simply acknowledgement similarly to the manual options to transfer objects outlined above.

As many applications on a particular machine may not be designed for sharing on a virtual window or being run on other devices with different operating systems, displays and other hardware or software configurations, the Virtual Collaboration and Computing Platform is configured to allow sharing of these applications regardless of the hardware or software configuration of the devices used in the platform.

Figure 9:
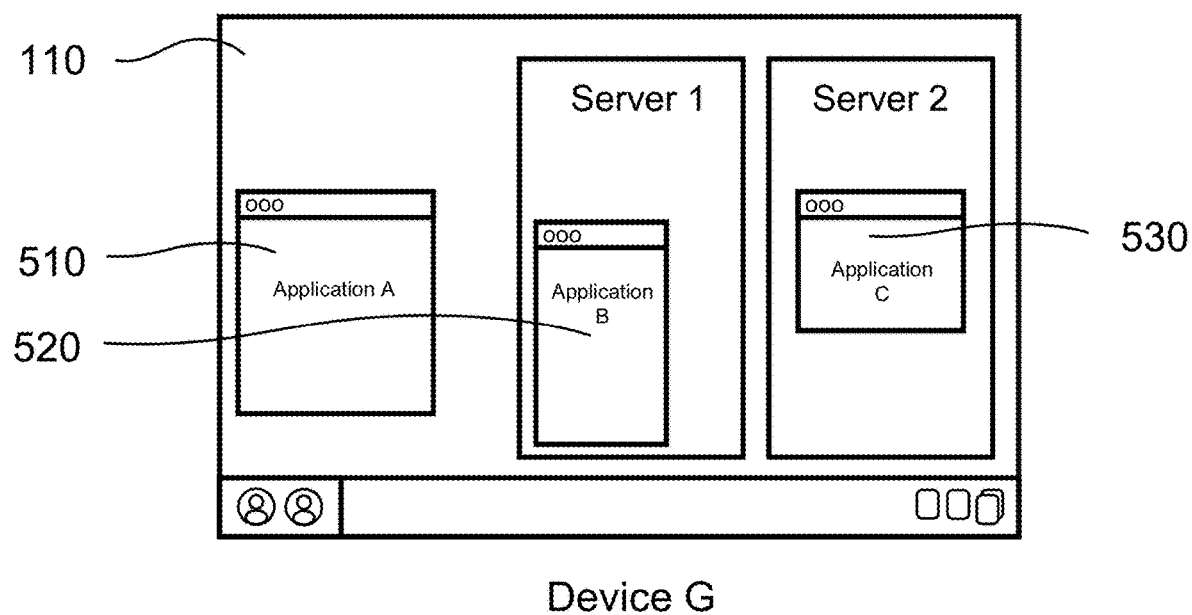
FIG. 9 is an illustration of processing multiple applications on different server nodes using the platform, according to one embodiment of the invention.

In one embodiment illustrated in FIG. 9, an application displayed and controlled from a shared workspace could be executed remotely on a server or virtual client. In other words, through a shared workspace several users could concurrently interact with a remotely executed application instance. In one embodiment, a user could remotely install applications on a server or virtual client even if the applications might not be adapted specifically for the use in a shared workspace.

In FIG. 9, in an exemplary embodiment of the disclosure, within the Sensitive Area 110 of the Virtual Collaboration and Computing Platform of Device G, Application B 520 (executed within Server 1) and Application C 530 (executed within Server 2) are remotely executed on remote servers instead of a local device, with Server 1 and Server 2 running the respective applications that were initially being run on Device A, while Application A 510 is still being executed locally on Device G.

By running the applications on a remote server, when a user reconnects to a previously disconnected workspace session he/she could continue to interact with the remotely executed application. Furthermore, a remotely executed application can keep running even though all clients have disconnected. After re-connection each client can continue to interact with the application through the re-established workspace.

Another advantage of remotely executed applications is that a client could perform tasks and use features not optimized or available through the client's hardware (e.g. chipsets, processors, storage, memory) or operating system (e.g. Microsoft Windows, Apple OSX, Linux) via a shared workspace.

[E] Computer-Enabled Embodiment

Figure 10:
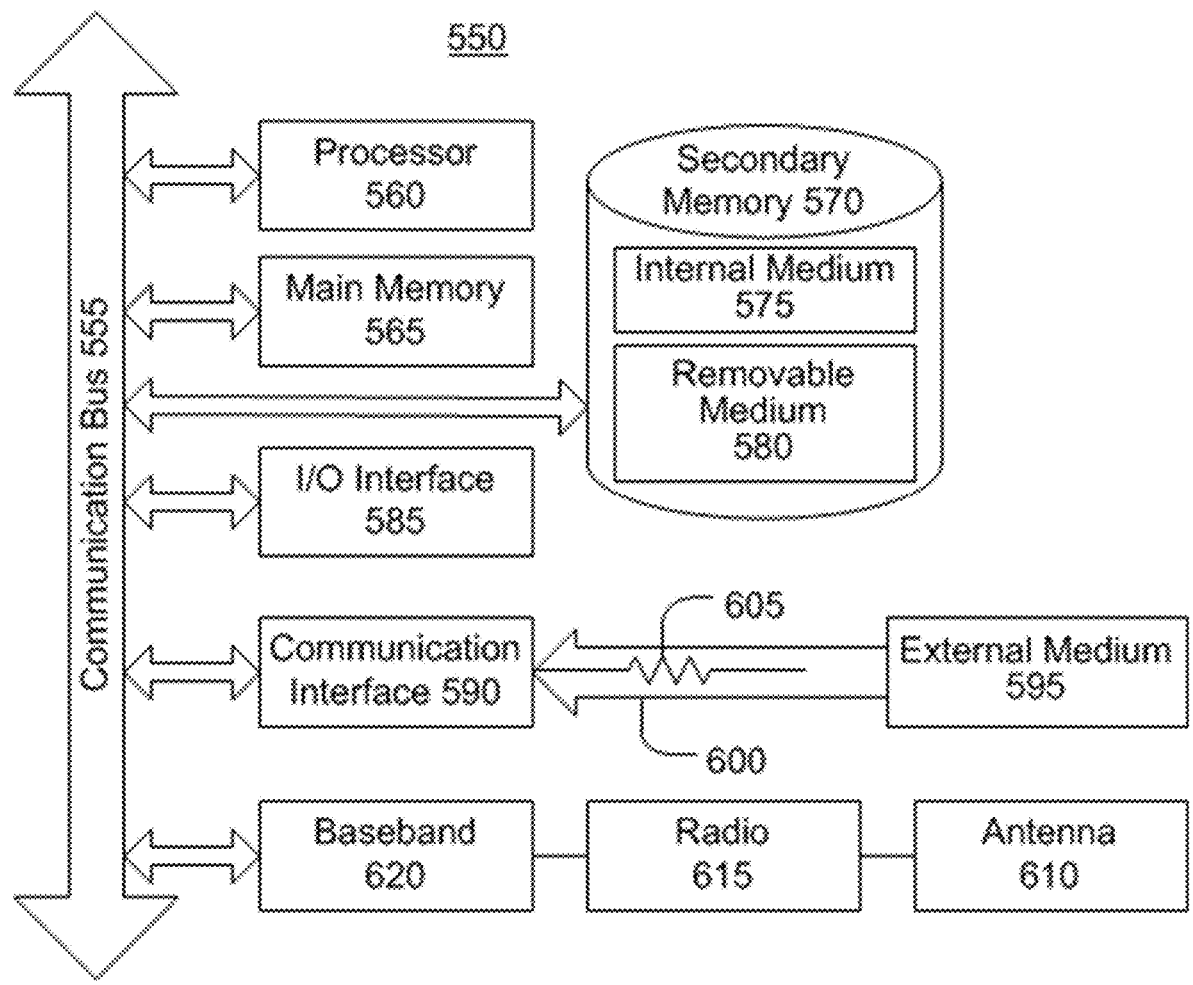
FIG. 10 is a block diagram illustrating an example wired or wireless processor enabled device that may be used in connection with various embodiments described herein.

FIG. 10 is a block diagram illustrating an example wired or wireless system 550 that may be used in connection with various embodiments described herein. For example, the system 550 may be used as or in conjunction with at least one devices shown in earlier figures as previously described with respect to FIGS. 1-9. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example, the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A technical system for interactive, virtual collaboration, the system comprising: a plurality of client devices running a virtual collaboration application displayed on respective device displays; a remote server in communication with the plurality of client devices, configured to coordinate sharing of application windows associated with respective applications between the plurality of client devices via the virtual collaboration application, wherein the application windows are configured to be resized, and wherein the virtual collaboration application is configured to adjust a location and a size of one of the application windows in view of respective environments associated with the plurality of client devices, wherein the respective environments are associated with at least one of a screen resolution or a relative location of the one of the application windows with respect to a screen size; wherein the virtual collaboration application is configured to share a first application via a first local application window displayed on a display device of a first client device of the plurality of client devices with others of the plurality of client devices in response to moving the first local application window onto a sensitive area on the display device associated with the virtual collaboration application, wherein the sensitive area is denominated as a user defined area of the display device, wherein the first application is executed locally on the first client device, wherein the first local application is shared with the others of the plurality of client devices via the virtual collaboration application as a remote application with content collected from a graphics controller or window handler of an operating system of the first client device that encodes individual frames as a video stream using a codec and sends the video stream to the remote server with screen resolution, window position and session identification information, and wherein a remote application window associated with the remote application is manifested and represented on a second client device of the plurality of client devices within a second local application window; wherein the virtual collaboration application is configured to allow the second client device to issue a request to perform an action to modify content within the first application, via the remote application, by transmitting the action to the first client device to perform the action on the first application such that the modified content is displayed on the first client device and the second client device; and wherein the system is a device and an operating system agnostically allowing sharing infrastructure of individual windows, providing a remote user operating the second client device an ability to further modify the content displayed within the remote application, wherein the first application is configured to be executed on and streamed from the first client device associated with a particular type or an operating system that differs from that of the second client device.

2. The system of claim 1, wherein at least one of applications, files, data or objects are configured to be shared among the plurality of client devices via a single interaction step without repeating any initial setup steps used to establish communication channels and sessions to start the virtual collaboration application.

3. The system of claim 2, wherein collaboration sessions are persistent and permanently available upon creation and enable participants to collaborate asynchronously and synchronously.

4. The system of claim 3, wherein activation and deactivation of communication channels and distributions of notifications occurs autonomously based on contextual cues.

5. The system of claim 4, wherein a plurality of natural user interfaces comprising eye tracking, face detection, face, gesture and voice recognition and natural language processing enable users to interact with the system using natural interactions.

6. The system of claim 5, wherein the system enables multiple client devices of the plurality of client devices to share the application windows associated with respective applications simultaneously with each other on a joint canvas.

7. The system of claim 6, wherein the system enables the plurality of client devices to interact with local application windows and shared application windows on a joint canvas simultaneously.

8. The system of claim 1, wherein the system engrains augmentation of shared information, through continuous image analysis of application video streams, to be able to overlay parts of the application video streams with text in view of low bandwidth where transmission of image data would result in a delayed transmission.

9. The system of claim 1 wherein the remote server is configured to coordinate sharing of a second remote application window associated with a third application via the virtual collaboration application, wherein the third application is executed locally on a third client device of the plurality of client devices, wherein the third application is shared with the first client device via the virtual collaboration application as a second remote application, wherein a second remote application window associated with the second remote application is manifested and represented on the first client device within a third local application window, and wherein the second remote application window is configured to be resized, and wherein the virtual collaboration application is configured to adjust a location and a size of the second remote application window in view of an environment associated with the first client device, wherein the environment is associated with at least one of a screen resolution or a relative location of the second remote application window with respect to a screen size.

10. A non-transitory computer storage medium which stores an executable code module that directs a client computing device to perform a process comprising:
(i) specifying a sensitive area within a local display window configured to be displayed on the client computing device, wherein the sensitive area is associated with a virtual collaboration application;
(ii) dragging a first local application window associated with a first application comprising local content into the sensitive area to share with a remote client computing device, via the virtual collaboration application, as a remote application, wherein virtual collaboration application is configured to share the first application with the remote client computing device via the first local application window in response to the dragging, wherein the first application is executed locally on the client computing device and wherein content is collected from a graphics controller or window handler of an operating system of the client computing device that encodes individual frames as a video stream using a codec and sends the video stream to the remote server with screen resolution, window position and session identification information;
wherein the local display window provides simultaneous display of the first local application window displaying the local content and a second application window, associated with a second application, comprising a remote content video that is streamed via and executed on the remote client computing device, wherein the second application window associated with the second application is manifested and represented on the client computing device within a second local application window, and wherein the second application window is configured to be resized, and wherein the virtual collaboration application is configured to adjust a location and a size of the second application window in view of an environment associated with the client computing device, wherein the environment is associated with at least one of a screen resolution or a relative location of the second application window with respect to a screen size;
in response to receiving, via the virtual collaboration application, a request, transmitted by the remote computing device, to perform an action to modify the local content comprised within the first application, performing the action to modify the local content such that the modified local content is displayed on the client computing device and the remote client computing device; and
wherein the first local application window comprising the local content is shared with the remote client computing device in response to the first local application window being dragged such that a portion less than an entirety of the first local application window overlaps the sensitive area.

11. The non-transitory computer storage medium of claim 10, wherein the remote client computing device transmits the request to modify the local content to the virtual collaboration application using keyboard, mouse, or touch interactions via keyboard, mouse, and touch commands, wherein the keyboard, mouse, and touch commands are executed on the remote client computing device and transmitted as the request to the client computing device via the virtual collaboration application.

12. The non-transitory computer storage medium of claim 10, wherein the first local application window comprising local content is shared with the remote client computing device in response to the first local application window being dragged into the sensitive area and determining that a majority portion of the first local application window covers the sensitive area.

13. The non-transitory computer storage medium of claim 10, wherein the remote application continues to display the local content in response to determining that the local content simultaneously executes on a remote server when that the client computing device is turned off.

14. A frictionless cloud-based virtual collaboration system, the system comprising a virtual collaboration window configured to:
allow a user operating a user device to move a first local application window comprising native content into the virtual collaboration window associated with a virtual collaboration application, wherein virtual collaboration application is configured to share a first application with a remote user device via the first local application window in response to the move, wherein the native content is configured to be displayed on the user device and video streamed to a remote application window executing on the remote user device in response to the virtual collaboration application detecting that the native content has moved from a display window to overlap with the virtual collaboration window, wherein the remote application window is filled with a dedicated video stream captured from the user device to appear indistinguishable from a second local application window, wherein the dedicated video stream has content collected from a graphics controller or window handler of an operating system of the user device that encodes individual frames as the dedicated video stream using a codec and sends the dedicated video stream to a remote server with screen resolution, window position and session identification information, wherein the remote application window can be interacted with in a similar manner as the second local application window which is a native application window on the remote user device, wherein the first application is executed locally on the user device and shared with the remote user device, via the virtual collaboration application, as a remote application, wherein a remote application window associated with the remote application is manifested and represented on the remote user device as the second local application window, wherein the remote application window is configured to be resized, and wherein the virtual collaboration application is configured to adjust a location and a size of the remote application window in view of an environment associated with the remote user device, wherein the environment is associated with at least one of a screen resolution or a relative location of the remote application window with respect to a screen size;

decode and provide for display a remote video stream of remote content received from the remote server, the remote video sourced from the virtual collaboration application, in response to the virtual collaboration application detecting that the remote content has moved from a remote display window to overlap with the remote collaboration application window;

in response to receiving, via the virtual collaboration application, a request, transmitted by the remote user device, to perform an action to modify the native content within the first local application window, performing the action to modify the native content such that the modified native content is displayed on the user device and the remote user device; and wherein the display window is configured to permit the user device to use a plurality of native applications without sharing at least one of the plurality of native applications in the virtual collaboration window.

15. The frictionless cloud-based virtual collaboration system of claim 14, wherein the virtual collaboration window is further configured to execute continuously on the user device to continuously track overlap between a plurality of native application windows associated with the plurality of native applications and the virtual collaboration window on a two dimensional display canvas.

16. The frictionless cloud-based virtual collaboration system of claim 14, wherein at least one of the native content or the remote content is configured to be executed remotely on a server and the system is configured to allow the user device to reconnect to a previously disconnected shared session and continue to interact with at least one of the native content or the remote content displayed within the virtual collaboration window.

17. The frictionless cloud-based virtual collaboration system of claim 14, further comprising a virtualization module configured to allow the native content to be transferred to the remote user device encapsulation and virtualization of an entire application and a processing state of the entire application, to transfer it to a remote client computing device, wherein the remote user device continues to execute the native content entire application after transfer when the native content entire application is no longer running on the user device.

* * * * *